United States Patent [19]

Brown

[11] 3,995,002
[45] Nov. 30, 1976

[54] ORTHOCASTING SYSTEM

[76] Inventor: Dennis N. Brown, 8528 Custer School Road, Custer, Wash. 98240

[22] Filed: Nov. 7, 1974

[21] Appl. No.: 521,889

[52] U.S. Cl. .............................. 264/90; 12/142 R; 264/101; 264/223; 264/227; 264/DIG. 30
[51] Int. Cl.² .......................................... B29C 1/02
[58] Field of Search .... 264/222, 223, 227, DIG. 30, 264/101, 90; 36/43, 44; 12/142 R, 142 N, 146 M; 425/2

[56] References Cited
UNITED STATES PATENTS

| | | | |
|---|---|---|---|
| 1,044,170 | 11/1912 | Guilford | 425/2 |
| 1,647,639 | 11/1927 | Larson | 264/223 |
| 2,136,815 | 11/1938 | Forster et al. | 264/223 |
| 2,593,742 | 4/1952 | Friedman | 264/223 |
| 3,227,795 | 1/1966 | Ingersoll | 264/223 |
| 3,398,221 | 8/1968 | Sherman et al. | 264/223 |
| 3,458,898 | 8/1969 | Casparis | 264/223 |
| 3,626,954 | 12/1971 | Ostrom | 264/DIG. 30 |

*Primary Examiner*—Robert F. White
*Assistant Examiner*—T. E. Balhoff
*Attorney, Agent, or Firm*—Blair & Brown

[57] ABSTRACT

An orthocasting system for producing a negative mold of the bottom of the foot with the negative mold being used to produce a positive form which is then used as a base on which to form a rigid foot support insert which is constructed in accordance with a prescription prepared by a foot doctor.

4 Claims, 7 Drawing Figures

ORTHOCASTING SYSTEM

BACKGROUND OF THE INVENTION

FIELD OF THE INVENTION

The present invention relates to an orthocasting system for producing custom foot support shoe inserts.

SUMMARY OF THE INVENTION

The orthocasting system of the present invention is directed to a method of producing a negative mold of the bottom of the foot useful for then producing a positive form of the foot on which a rigid foot support is constructed in accordance with the prescription of a foot doctor.

The primary object of the invention is to provide an orthocasting system which makes a mold of the foot in a particular desired manner so that the finished support will maintain the foot in a desired way during use.

Other objects and advantages will become apparent in the following specification when considered in light of the attached drawings.

DESCRIPTION OF THE PREFERRED EMBODIMENT

Figure 5:
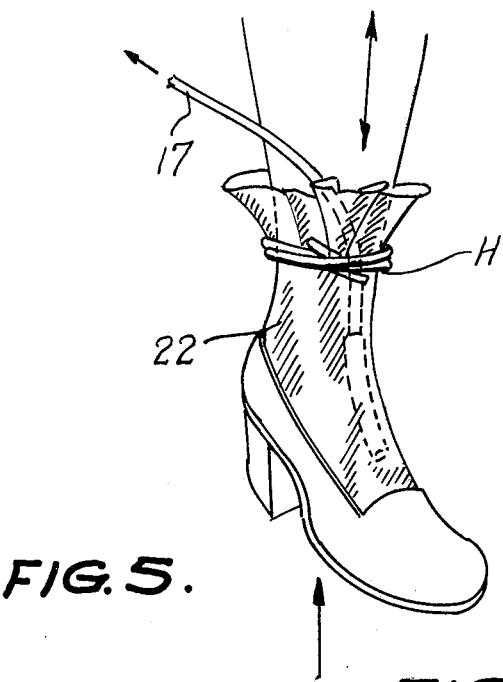
FIG. 5 is a perspective view of another step of the method.
Figure 6:
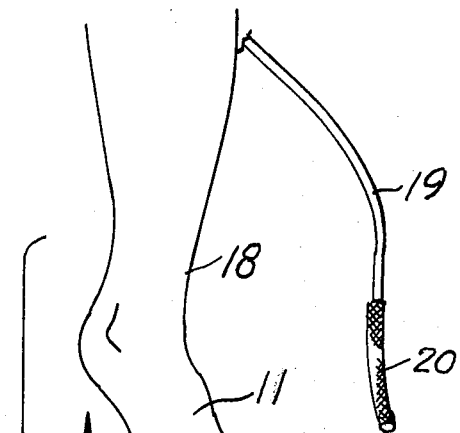
FIG. 6 is an exploded perspective view of the elements of the system shown in their related positions.

Referring now to the drawings in detail wherein like reference characters indicate like parts throughout the several figures the reference numeral 10 indicates generally a support constructed in accordance with the invention following the method thereof.

Figure 1:
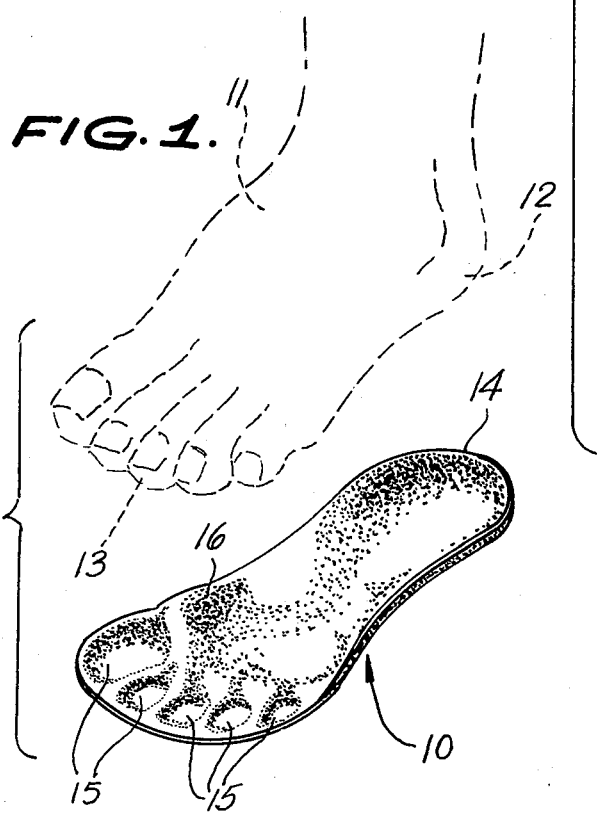
FIG. 1 is a perspective view of a rigid foot support constructed in accordance with the invention with the human foot being shown in broken lines adjacent thereto.
Figure 7:
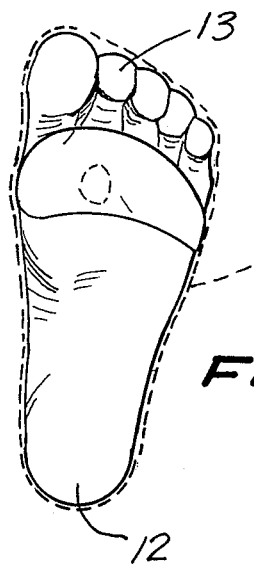
FIG. 7 is a bottom plan view of a foot having the system applied thereto.

FIG. 1 illustrates in broken lines a human foot 11 having a heel 12 and a plurality of toes 13. The foot support 10 is of generally rigid plastic material and has a concaved rear portion 14 to receive the heel of the foot, concavities 15 at the opposite end of the support 10 for receiving the toes of the foot and a concavity 16 between the heel concavities 14 and the toe concavities 15 to receive the ball of the foot. The shape of the support 10 will vary in accordance with the prescription written by a foot doctor and by the shape of the foot 11.

Figure 2:
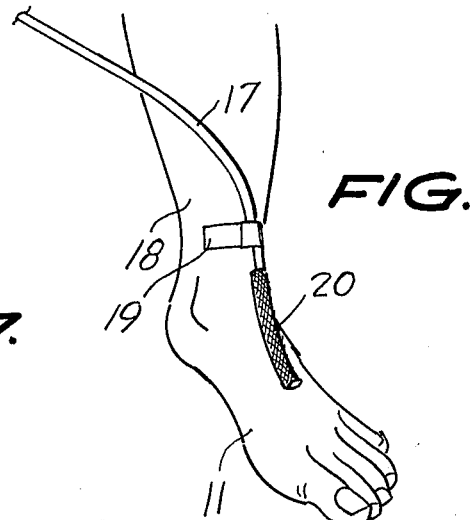
FIG. 2 is a perspective view of an initial step of the method.
Figure 3:
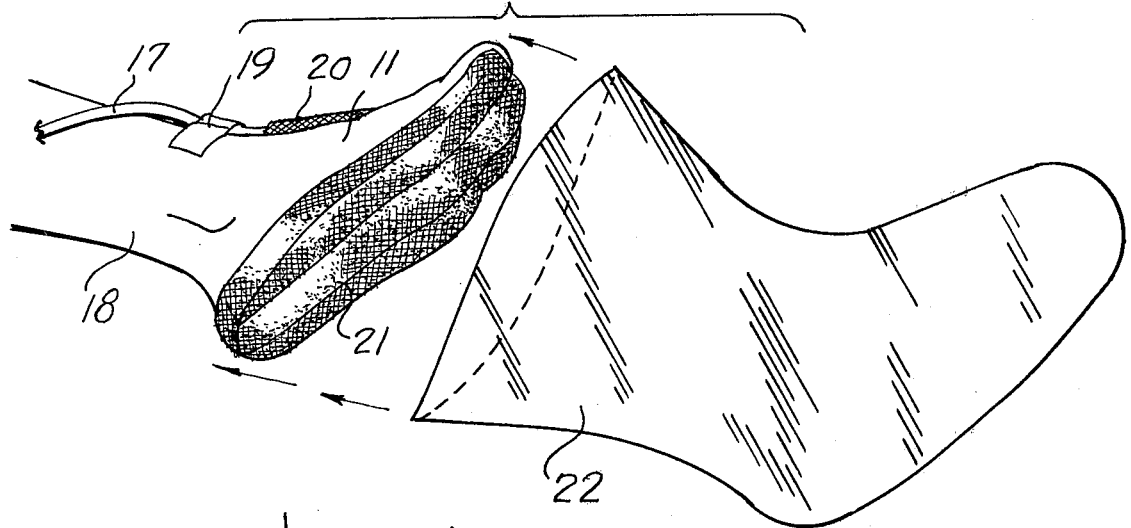
FIG. 3 is a perspective view of another step of the method.
Figure 4:
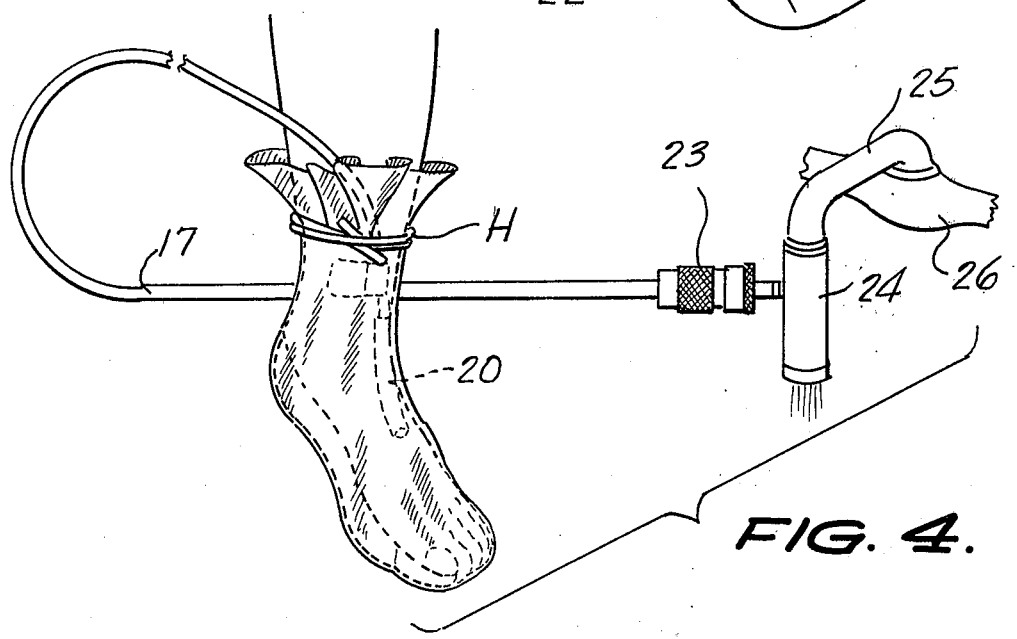
FIG. 4 is a perspective view of still another step of the method.

In FIG. 2 the foot 11 is shown supplied with a suction hose 17 secured to the ankle 18 by an adhesive tape 19. An elongate suction nozzle 20 is secured to the suction hose 17 and rests against the top of the foot 11. A mold 21 is positioned against the bottom of the foot 11 as can be seen in FIG. 3 following which a plastic bag 22 is pulled over the foot 11 and secured around the ankle 18 by flexible tubing H. The suction hose 17 is connected by a fitting 23 through an aspirator 24 mounted on the outlet 25 of conventional faucets 26.

The mold 21 consists of a plurality of layers of splints which are applied to the bottom of the foot 11 and which will harden on drying to provide a negative mold of the bottom of the foot. The mold 21 is then used to produce a plaster of paris positive form of the foot on which a rigid appliance 10 is formed. The rigid appliance 10 is useful as an insert to a shoe to support the foot in a desired manner.

The orthocasting system and the method of utilizing the orthocasting system is described in detail below.

Simply stated, Functional Biomechanics as applied to the foot, is the science which deals with joint position, joint motion, muscle activity during normal and abnormal function of the foot and lower extremity. To understand the implications and applications of biomechanical motions, the following brief dissertations are presented on normal structure, normal function as well as abnormal structure and abnormal function.

The following is a list of normal structure required for normal function:

1. Tibia — The tibia is perpendicular to the floor. Neither the long axis of the tibia nor the distal one-third of the tibia form an angle to the transverse plane. Thus the distal tibial articular surface is parallel to the transverse plane.

2. Subtaler Joint Motion — Ideally the subtalar joint has a measurable frontal plane range of motion of approximately 30°. The range of inversion relative to the tibia is approximately twice as great as a range of eversion to the tibia. When the subtalar joint is in its neutral position, that is, neither pronated nor supinated, the calcaneus rests perpendicular to the supporting surface.

3. Forefoot — In the ideal functional position the forefoot is perpendicular to the calcaneus. This relationship exists when the subtalor joint is neutral (neither pronated nor supinated) and the midtarsal joint is locked.

4. Ankle Joint Motion — The functional requirements of gait demand that the foot dorsiflex approximately 8° to 9° at the ankle joint and thus permitting the tibia to anteriorly deviate towards the foot during the stance phase of gait. Thus normal function requires approximately 8° to 10° of ankle joint dorsiflexion during the stance phase of gait.

5. Malleolor Torsion — The transverse plane twist along the long axis of the tibia is approximately 18° to 23° in an external distal direction. In other words, when the proximal aspect of the tibia is centered in the sagital plane (straight ahead) the distal aspect (Facet) will be externally deviated by 18° to 23°. It is this factor that abducts the foot in gait.

6. Femoral Torsion/Motion — These very complex requirements of normal functions are simplified by noting the clinical trueism that the internal rotation of the femur should equal the external rotation of the femur. In such a condition the patella (knee cap) essentially lies in the sagittal plane (straight ahead). Internal rotation of 40° and external rotation of 40° is considered normal, although this value is not required for normal walking. Increase in cadence and length of stride increase rotational requirements. Hence the transversed plane rotational requirements are increased during running as compared to normal walking.

NORMAL FUNCTIONS

It will become obvious with the progression of this section that the foot and lower extremity function as an intergrated inter-dependent system. Essentially all factors must be favorable in order for the foot to function normally.

For both theoretical and clinical simplification the gait cycle has been divided into a stance phase and a swing phase of gait. Further, the stance phase of gait has been additionally subdivided into quarters and therefore one may speak of events or phenomena occuring at 25, 50 or 75% of the stance phase of gait. (Please note this is not the same as 25, 50 or 75% of the entire gait cycle).

At heel contact the leg (femur, tibia and fibula) are internally rotating and continue to do so until approximately 25% of the stance phase of gait. At this time the leg reverses direction and begins to externally rotate. This external rotation continues during the remainder of the stance phase of gait. This internal-external rotation of the leg has a direct effect upon the subtalor joint: As the leg internally rotates the subtalar joint pronates and as the leg externally rotates the subtalar joint supinates. As stated above, the directions of motion of the leg and the subtalar joint are parallel in direction but their magnitudes may vary from individual to individual.

A further interdependence is noted between these motions of internal-external rotations of the leg, the pronation-supination of the subtalar joint and the motions at the ankle joint. As the subtalar joint prontates, and the leg internally rotates the ankle joint correspondingly plantarflexes. Conversely, as the subtalar joint supinates, the leg externally rotates and the ankle joint correspondingly dorsiflexes. If all of these three interdependent motions are functioning normally then a fourth phenomenon, locking of the midtarsal joint and primarily determines the stability of the foot. An unlocked midtarsal joint renders the foot unstable and mobile while a locked midtarsal joint renders the foot a stable rigid lever. This locking mechanism is complex and the following is simplistically presented.

This mechanism basically provides that when the axis of the calcaneal-cuboid joint is oblique to the axis of the talo-navicular joint rigidity of the midtarsal joint resulted since mechanical stability was achieved. Note, that in this circumstance the motion of one joint blocked the motion of the corresponding partner and vice versa since osseous impingement resulted. In other words, independent motion in the talo-navicular joint is not possible since the direction of motion in that joint would result in osseous impingement against the adjacent bones. However when the axes of motion are parallel, the bones can move in parallel directions independent of each other. In essence then, the joint is unlocked and unstable. Note that both the locked and unlocked state are phsiological. At heel contact the foot functions as a mobile adapter and in this state the midtarsal joint is unlocked. During the major remaining portion of the stance phase of gait, the foot must become a rigid lever requiring the midtarsal joint to become locked.

The change in the relative position of the axes occur with the more proximal motions of the foot, specifically, motion at the subtalar joint. At heel contact when the subtalar joint pronates the axes are parallel (midtarsal joint unlocked) but as the subtalar joint supinates the axes become progressively more oblique. At midstance with the subtalar joint neutral, the midtarsal is locked (axes oblique) thus, at this time, the foot is a rigid lever. Clinically the locking of the midtarsal joints appears to be not only related to the perpendicular calcaneus but also appears to be related to the neutral position of the subtalar joint. In the cases of rearfoot varus, when the subtalar joint is neutral the calcaneus is inverted to the supporting surface. As the foot pronates, that is the calcaneus everts, in an attempt to reach the perpendicular to the floor, the midtarsal joint tends to unlock. In any event, midtarsal joint stability is related to these two phenomenon but one cannot specifically quantitate the degree of importance, for indeed, some cases appear to relate primarily to the perpendicular calcaneus while others are related primarily to the neutral position of the subtalar joint.

A second peculiarity of the subtalar joint and midtarsal joint interaction must be further expanded. Please be reminded that the motions of the subtalar joint and midtarsal joint are; pronation, supination and in reality are tri-plane motions. Also note that the excursions of motion of the subtalar joint and the midtarsal joint are not fixed and the exact magnitude of these motions cannot be accurately quantitated.

The significance is simple. The range of motion in the direction of pronation and in the direction of supination is the greatest in the midtarsal joint when the subtalar joint is maximally pronated and the range of motion in the midtarsal joint is the least when the subtalar joint is maximally supinated.

Now consider the range of motion of the midtarsal joint when the subtalar joint is in its neutral position (neither pronated nor supinated). As one might expect, the range of motion of the midtarsal joint in this instance is greater than when the subtalar joint is supinated but less than when the subtalar joint is fully pronated. In all of these instances the midtarsal joint locks in its maximally pronated position or in other words, the midtarsal joint is locked (stable), it is fully pronated.

At this juncture it is important to expand and clarify the importance to these relationships. Again note that when the subtalar joint is neutral the midtarsal joint locks in its position of maximum pronation. Also note that when the subtalar joint is maximally pronated the midtarsal joint locks in its position of maximum pronation. However, in the last instance the midtarsal joint is more pronated than in the first instance (albeit that both are maximally pronated). Thus the actual position at which the midtarsal joint locks depends upon the position of the subtalar joint. This system is further complicated in the pathological (abnormal) foot. If the subtalar joint were maximumly pronated and if the midtarsal joint were fully pronated but in an unresolved pronatory force (equinus, forefoot varus, rearfoot varus) was applied to this mechanical system then the midtarsal joint would not lock (or it would remain unlocked) and result in hypermobility of the foot. It must be emphasized, however, that both locked and unlocked states of the midtarsal joint are physiological. At heel contact the foot functions as a mobile adapter and in this state the midtarsal joint is unlocked during the major remaining portion of the stance phase of gait the foot must become a rigid lever requiring the midtarsal joint to become locked. In the case of the maximum pronated subtalar joint and the increase in range of motion of the midtarsal joint a potential clincal problem is noted. If the subtalar joint is maximally pronated and midtarsal joint at its end of range of motion and if there is a significant pronatory force present on the foot then the midtarsal joint will unlock rendering the foot hypermobile. It is the unlocking and subluxing which renders the foot hypermobile and an inadequate mechanical system for stable weight bearing.

It is the midtarsal joint which makes the foot a rigid lever and thus imparts stability to the foot. Another major phenomenon of the forefoot must also be discussed. The first ray and hallux are the final biomechanical segments bearing weight at the time of toe off. Since the first ray has an independent axis of motion it is obvious that this segment also requires a stabilizing mechanism. The peroneus longus muscle tendon has a tri-plane force (of plantarflexion, posterior axial force and abduction of the 1st ray onto the 2nd ray) which provides for this stability. However, it must be pointed out that this mechanism can only be functional if the midtarsal joint is locked. The principle of a closed kinetic chain states that if the distal segments are to be stable then all proximal segments must be stable. In essence, the 1st ray stabilizing factor is inadequate in the presence of an unstable proximal segment, or in other words, in the presence of the unlocked midtarsal joint.

Thus, normal function implies a complex series of interdependent motions and events. In summary, one can say that the internal-external rotation of the limb is an integrated function with both ankle joint plantarflexion dorsiflexion and subtalar joint pronation-supination. The subtalar joint motion in turn influences the stability of the midtarsal joint depending upon the demands placed upon the foot. Thus, at heel contact the subtalar joint is pronating and the midtarsal joint is unlocked equating the foot to a mobile adapter. By midstance, however, the subtalar joint is neutral and the midtarsal joint is locked, thereby imparting the needed rigidity in order for the foot to function as a rigid lever. The forefoot thus stabilized and the peroneus longus able to stabilize the 1st ray is preparation for active propulsion from the Hallux.

ABNORMAL STRUCTURE AND THE IMMEDIATE EFFECT

Structure

A. Rearfoot Varus

1. Tibia Varum — A structural abnormality of the tibia such as the distal aspect of the tibia is closer to the midline of the body than is the proximal aspect. The net effect is to place the whole foot inverted to the floor prior to heel contact.

2. Subtalar Varus — by clinical observation it has been determined that when the subtalar joint is in its neutral position (neither pronated nor supinated) the calcaneus is inverted to the floor. Attention is drawn to the fact that this is not a fixed deformity of calcaneal varus, but rather an inverted positional relationship with calcaneus when the subtalar joint is neither pronated nor supinated. The net effect of this abnormality is to place the calcaneus inverted to the floor at heel contact on a positional basis rather than on a structural basis.

METHOD OF COMPENSATION

In both instances of tibia varum and subtalar varus (collectively) called rearfoot varus) the calcaneus is in an inverted position at heel strike. To compensate, the subtalar joint pronates in order to obtain the eversion component from that motion (remember pronation is abduction, eversion and dorsiflexion. The calcaneus will always attempt to reach the perpendicular to the floor. If there is insufficient motion available at the subtalar joint then these abnormalities cannot fully compensate in the calcaneus will remain somewhat inverted. Note, the midtarsal joint may unlock or may remain relatively locked in the presence of a rearfoot varus.

B. Equinus

In this present context equinus refers to a lack of dorsiflexion, specifically 7 or less. (note, dorsiflexion is measured with the knee extended and the subtalar joint neutral). If prior to midstance the ankle joint cannot dorsiflex 8° then the tibia cannot anteriorly deviate over the implated foot.

Compensation is achieved by pronating the subtalar joint in order to obtain the dorsiflexion component of the triplane motion (pronation; abduction, eversion and dorsiflexion). This abnormality is a severe pronator of the subtalar joint. If the abnormality is not fully compensated at the subtalar joint then the midtarsal joint unlocks and abnormally pronates in order to obtain the dorsiflexion component of pronation.

C. Forefoot Varus

Forefoot varus is an inverted position of the plane of the metatarsals (forefoot) relative to the calcaneus. Note, that this measurement is taken when the subtalar joint is neutral and the midtarsal joint is locked. This deformity causes a retrograde pronatory force on the subtalar joint in order to evert the whole foot and thus permit the forefoot to reach the supporting surface. With the subtalar joint pronated the midtarsal joint unlocks rendering the foot unstable.

D. Forefoot Valgus

This abnormality is an everted position of the forefoot to the rearfoot (Note, this abnormality is evaluated when the subtalar joint is neutral and the midtarsal joint is locked). Since this abnormality is essentially the opposite to a forefoot varus, its compensation is in the opposite direction. In other words the foot must supinate in order to place the forefoot on the transverse plane.

There are two sites for compensation each with its own individual clinical significance. If the compensation (supination) occures in the midtarsal joint then the deformity is called a mobile forefoot valgus and conversely, if the compensation (supination) occurs in the subtalar joint, then the deformity is called a rigid forefoot valgus.

1. Mobile Forefoot Valgus. In this abnormality the midtarsal joint supinates about the lone axis of this joint in order to invert the forefoot to the rearfoot. Because the oblique axis of the midtarsal joint is unlocked the forefoot is essentially hypermobile.

2. Rigid Forefoot Valgus. In this abnormality the midtarsal joint remains locked and thus no compensatory motion is available at this joint. The supinatory force is thus transferred retrogradely to the subtalar joint. Thus the subtalar joint supinates. Unfortunately this latter form of the forefoot valgus deformity is not common since it is essentially a rigid foot (locked midtarsal joint) and produces much less severe secondary symtoms.

A careful review of the afore going abnormalities reveals that with the exception of the forefoot valgus all the deformities caused a rearfoot (subtalar joint) to pronate. As stated earlier the supination of the subtalar joint plays a significant role in locking of the midtarsal joint. Thus if the subtalar joint excessively pronates and does not effectively resupinate in the 2nd quarter of the stance phase of gait then the midtarsal joint is unlocked rendering the foot hypermobile. In the case of a mobile forefoot valgus the midtarsal joint is intrinsically unstable and therefore this abnormality can be clinically categorized with the other abnormal rearfoot pronatory abnormalities.

ORTHOTICS

The purpose of a rigid orthotic (sometimes called a functional orthotic), is essentially to make the midtarsal joint function in its locked position, thus converting the mobile (pathological) foot to a rigid lever. This is achieved by taking a plaster of paris cast of the foot in a partially weight bearing or non weight bearing attitude with the midtarsal joint locked. A positive cast of plaster of paris is then made. Note, that his duplicate of foot captures abnormal bony relationships of the forefoot to the rearfoot with the midtarsal joint locked.

There are essentially two separate types of casts taken of the feet. The first, the so called neutral cast, is taken with the subtalar joint "neutral" and the midtarsal joint locked. The second, (the so called "pronated" cast) is taken with the subtalar joint maximumly pronated but with the midtarsal joint locked. Of the two methods of casting, the neutral cast is traditionally preferable since this represents the ideal functional position of the foot. However, it is frequently clinically desirable to fabricate an orthotic with the subtalar joint pronated and the midtarsal joint locked. This is a clinical judgment which offers latitude in the fabrication of rigid devices depending upon the pathology present, the type of foot gear, as well as the individual demands placed upon the foot itself.

POSTING

Posting is the addition of a wedge on either the forefoot and/or the rearfoot of the orthotic in order to externally compensate for the varus or valgus abnormalities with the structure of the foot. Essentially a forefoot varus of 3° would require a forefoot varus post of 3° thus making the forefoot perpendicular to the rearfoot. Conversely a forefoot valgus of 3° could be negated by a forefoot valgus post of 3°, again making the forefoot perpendicular to the rearfoot. The rearfoot post would be used in case of rearfoot varus in order to wedge the calcaneus into an inverted position such that the subtalar joint would function around its neutral position.

In summation then the value of a rigid orthotic lies in its ability to lock the midtarsal joint and therefore make the foot a rigid lever. Further, this device can be posted in order to tilt the device relative to the foot in order to negate pathological abnormalities. A rigid orthotic with a subtalar joint neutral and the midtarsal joint locked is ideal. However, the orthotic may be fabricated with the subtalar joint pronated and the midtarsal joint locked.

Generally speaking a rigid orthotic is fabricated as follows;

A plaster of paris slipper cast (or also called a negative cast) is taken of the foot.

The cast is then filled with plaster of paris and when hardened a duplicate of the foot is obtained.

The plantar aspect (sole) of the foot is lightly sanded and additional plaster of paris is added in certain areas in order to accommodate for soft tissue expansion. Plaster may also be added to other areas as "correction" i.e., an external compensation for a forefoot deformity.

Finally, a rigid material is molded to the contour of the plantar aspect of the cast.

METHODS OF CASTING WITH PLASTER OF PARIS

Plaster of paris impressions (so called "slipper cast"), (also called negative casting) of the feet are generally taken non weight bearing and occassionally semi-weight bearing. The non weight bearing cast has traditionally proved itself to be the most satisfactory method of duplicating foot morphology since it produces a minimum of soft tissue distortions. Unfortunately, the techniques involved to exact the subtalar joint position (whether neutral or pronated) and the locked midtarsal position are complex, demanding and to many practitioners very frustrating.

While the accurate position of the subtalar joint is a genuine problem, the desired placement can be clinically achieved by observation, palpation, visual alignment and subjective appreciation of foot morphology. However, the greatest single problem in this casting technique is the locking of the midtarsal joint. All too frequently, this major tarsal joint is in an abnormal supinated relationship resulting in excessive forefoot varus. Fabrication of a device from a cast with an excessive forefoot varus is frequently a frank failure.

The semi-weight bearing cast offers simplicity of technique as its major feature. Plaster of paris splints are added to the foot which is then placed in a semi-weight bearing attitude or position. Note that this technique may be performed with or without the utilization of foot gear. Further, the force of weight may be direct (gravity) or indirect by manipulation (external force applied by the practitioner). The subtalar joint is placed in the desired position (neutral, maximumly pronated or a variance between these extremes).

The midtarsal joint is locked by the very act of bearing weight. Thus the midtarsal joints are readily aligned.

At this point attention is drawn to the fact that the reactive force of gravity on the forefoot is a dorsal reflex force on the forefoot. Since pronation is complex motion of abduction and eversion and dorsi-flexion, the reactive force of gravity pronated (dorsi-flexes) the forefoot and the rearfoot thus providing the necessary force to lock the midtarsal joint.

Unfortunately, application of weight stress to the mechanical system causes great distortions, especially to the Plantar (inferior) surface of the foot. Part of this distortion is due to the soft tissue compression along the Plantar aspect of the foot, and part is due to the pulling away of the Plaster from the skin of the foot in the area of the midtarsal joint. Thus, the cast has both flattened areas and severely wrinkled areas. As mentioned earlier, the Plantar surface is the primary surface from which the original orthodic is to be fabricated. The wrinkles on the Plantar surface of the foot in the area of the midtarsal joint, present a two-fold problem. In the first place, this is a technical distortion which requires a technical resolution in the laboratory. Far more important however, it is a loss of critical morphology in the area of the device which positions the midtarsal joint. Because of the distortion along the Plantar lateral aspect of the cast and because of the wrinkles in the area of the midtarsal joint the ability of a subsequently fabricated device to realign the tarsal joints is severely hampered.

Apply three layers of splints along Plantar surface of the foot, from sulcus to toes, up and around the heel. Cut splints so cast extends slightly over first and fifth M. P. joints to navicular.

A plastic bag is placed over the plaster and foot.

A suction tube set at a minimum 10 hg is placed along the dorsum of the foot. The proximal position of the bag is sealed. (Vacuum applied).

The foot is then placed in a semi weight bearing attitude (in shoe, out of shoe).

Because of the vacuum, the external wall (plastic bag) adheres to the foot. This not only prevents the formation of skin wrinkles across the critical area of midtarsal joint, but also decompresses the soft tissue deformation so characteristic of semi weight bearing casts. From this casting method, a positive cast can be made of plaster of paris and, ultimately, a functional rigid device fabricated.

GLOSSARY

Body Planes: There are three planes of the body. Each one perpendicular to the other two and these planes correspond to the three dimensions of space. They are the sagittal, frontal and transverse planes.

Sagittal Plane: This is a flat vertical plane cutting through the body from front to back, cutting it into a right section and a left section.

Frontal Plane: This is a vertical plane cutting through the body from side to side dividing it into a front section and a back section.

Transverse Plane: This is a horizontal section cutting through the body from side to side and from front to back, dividing the body into an upper section and a lower section.

MOTIONS OF THE FOOT

Adduction: This is transverse plane motion in which the distal aspect of the foot or part of the foot moves toward the midline of the body. The vertical axis of rotation is located in the proximal aspect of the foot or part.

Abduction: This is transverse plane motion in which the distal aspect of the foot or part of the foot moves away from the midline of the body. The vertical axis of rotation is located at the proximal aspect of the foot or part.

Inversion: This is frontal plane motion in which the plantar aspect of the foot or part is rotated so as to face more toward the midline of a body. The axis lies in the long plane of the part.

Eversion: This is frontal plane motion in which the plantar aspect of the foot or part of the foot is rotated so as to face further away from the midline of the body. Axis of motion lies in the long plane of the part.

Dorsiflexion: This is sagittal plane motion in which the distal aspect of the foot or part of the foot moves toward the tibia. The axis of rotation is located at the proximal aspect of the part.

Plantarflexion: This is sagittal plane motion in which the distal aspect of the foot or part of the foot moves away from the tibia. The axis of rotation is located at the proximal aspect of the part.

Pronation: This is tri-plane motion consisting of concomitant motion of the foot or part of the foot in the direction of abduction, eversion, and dorsiflexion. The axis lies on three planes and passes from posterior, plantar, and lateral to anterior, dorsal and medial.

Supination: This is tri-plane motion consisting of concomitant motion of the foot or part of the foot in the direction of adduction, inversion and plantarflexion. The axis of motion runs from posterior, plantar and lateral into anterior dorsal and medial.

POSITIONS OF THE FOOT

Adducted: The distal portion of the foot or part of the foot is deviated toward the midline of the body.

Inverted: The foot or any part of the foot is rotated such that the plantar surface of the foot or plantar surface of the part faces toward the midline of the body.

Everted: The foot or any part of the foot is rotated such that the plantar aspect of the foot or part of the foot faces away from the midline of the body.

Plantarflexed: The foot or any part of the foot is deviated such that the distal aspect of the foot or part is further from the tibia.

Dorsiflexed: The foot or any part of the foot is deviated such that the distal aspect is closer to the tibia.

Pronated: The distal segment of a joint is abducted, everted and dorsiflexed, relative to the proximal segment of the same joint.

Supinated: The distal segment of a joint is adducted, inverted and plantarflexed, relative to the proximal segment of that joint.

GENERAL DEFINITIONS

Compensation: A change of structure positions or functions in one part in an attempt to adjust or neutralize an abnormal force or deviated structure or deviated position or abnormal functions of another part.

Hypermobility: Motion occurring in a joint at a time when that joint should be stable.

Subluxation: A gradual displacement of the integrity of a joint while that joint is in a state of hypermobility. This results in eventual remodeling of the joint.

The method of the orthocasting system described above permits the formation of a foot support appliance which conforms to the shape and needs of the patient to permit normal walking.

Having described the preferred embodiment of the invention it should be understood that numerous steps may be modified in the method without departing from the spirit of the invention.

What is claimed is:

1. A method of forming a custom foot support appliance comprising the steps of applying a molding material to the sole of the foot, securing a suction hose to the upper surface of the foot, covering the molding material and the suction hose with an air tight bag secured in air tight relation to the ankle of the user, applying a vacuum to the air tight bag to draw the bag into tight contact with the molding material and the foot, manipulating the foot to produce the desired foot position for forming a mold of the bottom of the foot, permitting the molding material to harden to a mold out of contact with the foot, casting a positive mold of the bottom of the foot in said mold, and forming a rigid foot support appliance on said positive mold.

2. A method as claimed in claim 1 including the step of inserting the foot covered with the air tight bag into a shoe prior to manipulation and hardening of the molding material to a mold.

3. A method as claimed in claim 2 including the steps of applying a plurality of splints to the bottom of the foot as the molding material.

4. The method of claim 1 including the application of a post to either the front or rear portion of said foot support to maintain the proper level of support.

* * * * *